US007365947B2

(12) United States Patent
Honda et al.

(10) Patent No.: US 7,365,947 B2
(45) Date of Patent: Apr. 29, 2008

(54) HEAD SUPPORT MECHANISM, HEAD ARM ASSEMBLY, AND DISK DRIVE APPARATUS WITH HEAD ARM ASSEMBLY WITH WEIGHT FORMED AROUND HORIZONTAL BEARING

(75) Inventors: Takashi Honda, Tokyo (JP); Yoshihisa Higuchi, Tokyo (JP); Katsuki Kurihara, Tokyo (JP); Takeshi Wada, Tokyo (JP)

(73) Assignee: TDK Corporation, Tokyo (JP)

( * ) Notice: Subject to any disclaimer, the term of this patent is extended or adjusted under 35 U.S.C. 154(b) by 347 days.

(21) Appl. No.: 10/936,524

(22) Filed: Sep. 9, 2004

(65) Prior Publication Data

US 2005/0073776 A1 Apr. 7, 2005

(30) Foreign Application Priority Data

Oct. 6, 2003 (JP) ............................ 2003-346583

(51) Int. Cl.
*G11B 5/55* (2006.01)

(52) U.S. Cl. .................................................. 360/265.7

(58) Field of Classification Search ..................... None
See application file for complete search history.

(56) References Cited

U.S. PATENT DOCUMENTS 5,751,519 A * 5/1998 Hata ....................... 360/265.6
5,768,064 A * 6/1998 Baasch et al. ........... 360/266.1
6,751,064 B2 6/2004 Kuwajima et al. ....... 360/244.8
6,950,285 B2 * 9/2005 Wada et al. ............. 360/265.7
2002/0126419 A1 * 9/2002 Kuwajima et al. ....... 360/265.7

FOREIGN PATENT DOCUMENTS

JP 2004-71089 3/2004

* cited by examiner

*Primary Examiner*—David Davis
(74) *Attorney, Agent, or Firm*—Oblon, Spivak, McClelland, Maier & Neustadt, P.C.

(57) ABSTRACT

A head support mechanism includes a rigid support arm, a suspension for supporting, at its leading end section, a head slider with at least one head element, the suspension having a balance structure that can be pivoted in a direction crossing a surface of a recording medium using as a fulcrum a load support point established between the suspension and the support arm, a load generation unit for generating a load applied to the load support point for pressing the head slider toward the surface of the recording medium, a horizontal rotation bearing unit for pivotally bearing the support arm and the suspension so that the support arm and the suspension are capable of rotatively moving in a direction parallel to the surface of the recording medium, and an weight unit coupled to a trailing end section of the suspension to match the center of gravity of the suspension including the head slider with the load support point. The weight unit is formed around at least a part of the periphery of the horizontal rotation-bearing unit.

46 Claims, 10 Drawing Sheets

20
22
23
24
25
21

HEAD SUPPORT MECHANISM, HEAD ARM ASSEMBLY, AND DISK DRIVE APPARATUS WITH HEAD ARM ASSEMBLY WITH WEIGHT FORMED AROUND HORIZONTAL BEARING

PRIORITY CLAIM

This application claims priority from Japanese patent application No. 2003-346583, filed on Oct. 6, 2003, which is incorporated herein by reference.

BACKGROUND OF THE INVENTION

1. Field of the Invention

The present invention relates to a head support mechanism provided by assembling a support arm and a suspension, a head arm assembly (HAA) provided by mounting a flying type head slider for supporting a recording and/or reproducing head element such as a thin-film magnetic head or an optical head on the head support mechanism, and a disk drive apparatus provided with the HAA.

2. Description of the Related Art

In a magnetic disk drive apparatus, at least one magnetic head slider attached to a leading end section of an HAA is flying on a surface of a rotating magnetic disk. In this state, a thin-film magnetic head element formed on the magnetic head slider records and/or reproduces data on/or from the magnetic disk.

The HAA mainly has a magnetic head slider, a suspension with an elastic flexure that supports the magnetic head slider, an elastic load beam that supports the flexure at its leading end section and a base plate that supports a trailing end section of the load beam, and a rigid support arm that supports the suspension. A load to be applied on the magnetic head slider toward the surface of the magnetic disk is generated in a plate spring section provided in the middle of the load beam of the suspension.

Such a conventional HAA has a cantilever structure for supporting the suspension at its trailing end section. The cantilever structure is excellent in stabilizing the load applied on the magnetic head slider and saving a required space. However, the cantilever structure has a serious problem of a low shock resistance. Specifically, because the magnetic head slider is mounted at a leading end section of the HAA which is a free end of the cantilever structure, when a shock force is applied, the rotation moment of the magnetic head slider is added to a rotation moment based upon the mass of the whole system of the beam structure. As a result, a slap mode occurs in which the head slider jumps up from the magnetic disk surface or is slapped against the surface. According to the conventional HAA, this tendency is significantly observed, because the load beam, which is a beam structure supporting the magnetic head slider, is formed by a spring member of a low rigidity, namely a stainless steel plate slightly thicker than the flexure.

In a magnetic disk drive for 3.5-inch disks, which is mounted in a computer called a high-end type or desktop type, an excessive shock force is rarely applied. However, in a magnetic disk drive for 2.5-inch disks, which is mounted in a notebook computer, an excessive shock force is likely to be applied. Accordingly, the low shock resistance is a serious problem.

U.S. Pat. No. 6,751,064 B2 proposes a head support apparatus in which to improve the shock resistance of an HAA, a rigid arm is provided with a magnetic head slider at one end and voice coil motor (VCM) for horizontal rotation at the other end. Further, in this apparatus, the arm is configured to rotatively move in a radial direction of the magnetic disk around a bearing section and is also configured to have a balance structure in which the arm can be rotatively moved in a direction perpendicular to the magnetic disk surface around a bearing section. Moreover, a pivot is used to urge a plate spring plate provided in the bearing section to apply a load to the magnetic head slider.

In such HAA with the balance structure, because the distance between the VCM and the magnetic head slider is short in case of a small-diameter magnetic disk apparatus such as a micro drive and a single disk, the weight of a part of the arm in the VCM side from the bearing section can be balanced with a part of the arm in the magnetic head slider side from the bearing section. However, in a larger-diameter magnetic disk drive for, for example, 1.8-inch or 2.5-inch disks, the arm is longer, so that it is difficult to ensure a sufficient shock resistance. Moreover, since the VCM is used to balance the balance structure, the magnetic disk apparatus cannot be configured so as to allow a plurality of HAAs with the balance structure to stack each other.

To eliminate such an inconvenience, inventors of the present application proposed the employment of a balance structure at a leading end section of a support arm.

FIG. 1 is a side view illustrating a schematic configuration of an HAA proposed by the inventors.

In the figure, reference numeral 10 designates a support arm. Reference numeral 11 designates a load beam of a balance structure that uses as a fulcrum a load support point 12, that is, a projection provided at a leading end section of the support arm 10. Reference numeral 13 designates a support spring for coupling the load beam 11 and the support arm 10 together to urge the load beam 11 via the projection 12. Reference numeral 14 designates a magnetic head slider supported at a leading end section of the load beam 11 via the flexure 15. Reference numeral 16 designates a magnetic disk.

In this HAA, since the load beam 11 of the balance structure is provided at the leading end section of the support arm 10, the increased length of the support arm does not substantially reduce the shock resistance. Also, because this structure does not use a coil section of a VCM to balance the balance structure, the magnetic disk apparatus can be configured so as to allow a plurality of HAAs to stack each other.

However, according to the HAA of the structure shown in FIG. 1, since a trailing end section (lying opposite the end at which the magnetic head slider 14 is mounted) 11*a* of the load beam 11 is extended to balance rotation moments, when the HAA receives a shock, the extended part is displaced. That is, in order to make the rotation moment of the part between the projection or load support point 12 and the leading end section (magnetic head slider side) equal to the rotation moment of the part between the projection or load support point 12 and the trailing end section (actuator (VCM) side), it is necessary to extend the trailing end section 11*a* of the load beam 11 or to attach a weight close to the trailing end section 11*a*. In this case, when a shock is applied, the trailing end section is displaced to interfere with the support arm 10 or the magnetic disk 16. Even when no shock is applied, if the magnetic disk apparatus employs a load unload system, the trailing end section 11*a* of the load beam 11 may contact with the surface of the magnetic disk 16. Thus, any increase in the magnitude of displacement in this trailing end section is undesirable.

Also, since the support arm is long, it is necessary to greatly increase its thickness to prevent the arm itself from being deformed by a shock. Furthermore, because the extended trailing end section 11*a* of the load beam 11 or the weight attached to the trailing end section is at a substantial distance from the horizontal axis of rotation (the center of seek rotation), disadvantageously, an inertia moment during a seek operation may directly increase. In addition, since the weight is provided in a gap between the support arm and the magnetic disk, it is difficult to optimize the shape of the weight. Namely, it is quite difficult to make a weight shape suitable for bending characteristics or torsion and sway characteristics.

BRIEF SUMMARY OF THE INVENTION

It is therefore an object of the present invention to provide a head support mechanism, an HAA and a disk drive apparatus, whereby an excellent shock resistance can be obtained to prevent an increase in inertia moment during a seek operation.

Another object of the present invention is to provide a head support mechanism, an HAA and a disk drive apparatus, whereby an excellent shock resistance can be obtained to allow a weight shape to be easily optimized.

Further object of the present invention is to provide a head support mechanism, an HAA and a disk drive apparatus, whereby both an excellent shock resistance and a high flexural rigidity can be obtained to provide a configuration with a plurality of HAAs stacked each other.

According to the present invention, a head support mechanism includes a rigid support arm, a suspension for supporting, at its leading end section, a head slider with at least one head element, the suspension having a balance structure that can be pivoted in a direction crossing a surface of a recording medium using as a fulcrum a load support point established between the suspension and the support arm, a load generation unit for generating a load applied to the load support point for pressing the head slider toward the surface of the recording medium, a horizontal rotation bearing unit for pivotally bearing the support arm and the suspension so that the support arm and the suspension are capable of rotatively moving in a direction parallel to the surface of the recording medium, and an weight unit coupled to a trailing end section of the suspension to match the center of gravity of the suspension including the head slider with the load support point. The weight unit is formed around at least a part of the periphery of the horizontal rotation-bearing unit.

Also, according to the present invention, an HAA has the above-mentioned head support mechanism and at least one head element mounted on the suspension of the head support mechanism.

Furthermore, according to the present invention, a disk drive apparatus includes at least one recording medium and at least one above-mentioned HAA.

The weight unit is coupled to the trailing end section of the suspension to match the center of gravity of the suspension including the head slider with the load support point, and is formed at least in a part of the periphery of the horizontal rotation-bearing unit. This prevents an increase in inertia moment during a seek operation. Also, it is unnecessary to extend the trailing end section of the suspension of the balance structure in order to balance rotation moments. This prevents the trailing end section of the suspension from interfering with the horizontal rotation-bearing unit. Moreover, the length of the trailing end side can be freely set, thus enabling the moments to be easily balanced. Of course, a high shock resistance can be obtained. In addition, since the weight of the trailing end section can be reduced, so that the weight unit can be extended and located closer to the trailing end section and outside the recording medium. This avoids interfering with the surface of the recording medium.

In the specification, the terms "leading end section" and "leading end side" refer to the section and direction of a side acting as a free end during operation, that is, the side on which the head slider is mounted. The terms "trailing end section" and "trailing end side" refer to the section and direction of the opposite side, on which the VCM is mounted.

It is preferred that the weight unit is formed to surround the horizontal rotation-bearing unit all around the periphery of the horizontal rotation-bearing unit. Since load concentrates at the load support point, this part of the suspension may be deformed and distorted to absorb energy to prevent the desired load from being obtained. When the weight unit is formed to surround the load support point, the deformation of that part can be minimized.

It is also preferred that the weight unit is formed around the periphery of the horizontal rotation bearing unit except for a trailing end section of the periphery of the horizontal rotation bearing unit.

It is preferred that the weight unit is also formed in a leading end side of the suspension from the load support point. In this case, preferably, the weight unit is thicker at a section near the load support point than that at other section. More preferably, the weight unit is increasingly thinner away from a vicinity of the load support point toward its trailing end. The weight unit is formed to be thick around the load support point taking possible deformation into account but to be increasingly thinner away from the load support point. This is because the trailing end is unlikely to be affected by deformation even though its rigidity is somewhat low and because in contrast, reducing the weight of the trailing end enables a reduction in the magnitude of deformation and thus in inertia moment.

It is preferred that the weight unit is formed only in a trailing end side of the suspension from the load support point. If the deformation at the load support point does not create any problems, the weight unit need not be formed to surround the load support point as described above.

It is also preferred that the weight unit is made of a molded resin. In case that the weight unit is formed of a molded resin, the degree of freedom in shape is so high that the desired shape can be created. Further, because the thickness can be increased without an increase in weight, it is possible to improve the shock resistance. That is, the employment of the resin material enables the mass to be reduced than that employing the metal material at the sacrifice of a decrease in Young's modulus. Thus, the thickness can correspondingly be increased to allow the use of a material excellent in Young's modulus versus specific gravity or a material having a large Young's modulus in spite of a low specific gravity. This makes it possible to increase the bending rigidity higher than that of the metal material.

It is further preferred that the load support point is a projecting section provided on the support arm or on the suspension.

It is preferred that the support arm is fixed to the horizontal rotation-bearing unit.

It is also preferred that the load generation unit includes a plate spring coupled with the suspension and the support arm.

It is further preferred that the suspension includes a rigid load beam, and a flexure fixed to the load beam, the flexure having an elasticity to control a flying attitude of the head slider mounted at the leading end section of the suspension. In this case, preferably, the load generation unit includes a plate spring formed integrally with the load beam and coupled with the support arm.

It is preferred that the head support mechanism further includes an actuator unit, that is a VCM, fixed to the horizontal rotation bearing unit to rotatively move the support arm and the suspension in a direction parallel to the surface of the recording medium.

Furthermore, the disk drive apparatus preferably includes a plurality of recording media, a plurality of the HAAs sharing the horizontal rotation bearing unit, and the single actuator, that is, a VCM, fixed to the horizontal rotation bearing unit to rotatively move the plurality of the HAAs in a direction parallel to the surface of the recording media.

Further objects and advantages of the present invention will be apparent from the following description of the preferred embodiments of the invention as illustrated in the accompanying drawings.

DETAILED DESCRIPTION OF THE INVENTION

Figure 1:
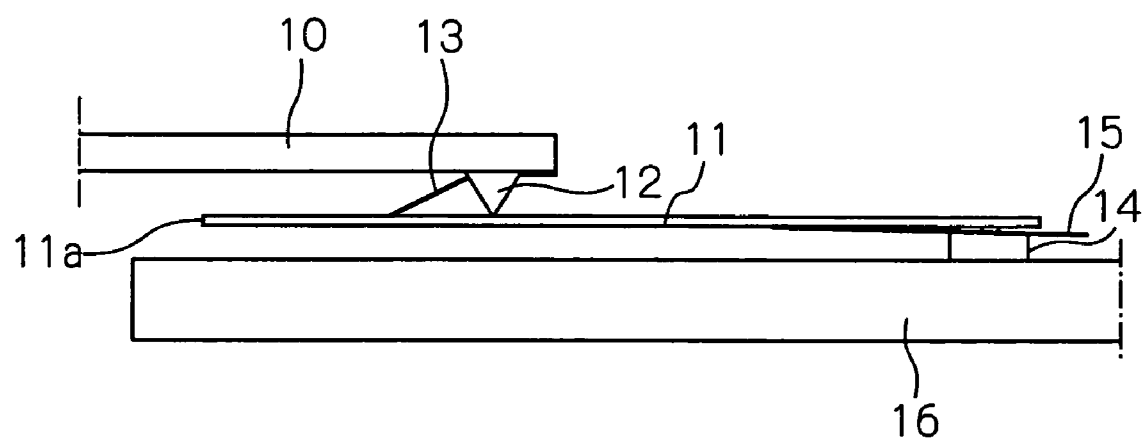
FIG. 1, already described, is a side view illustrating a schematic configuration of an HAA already proposed by the inventors.
Figure 2:
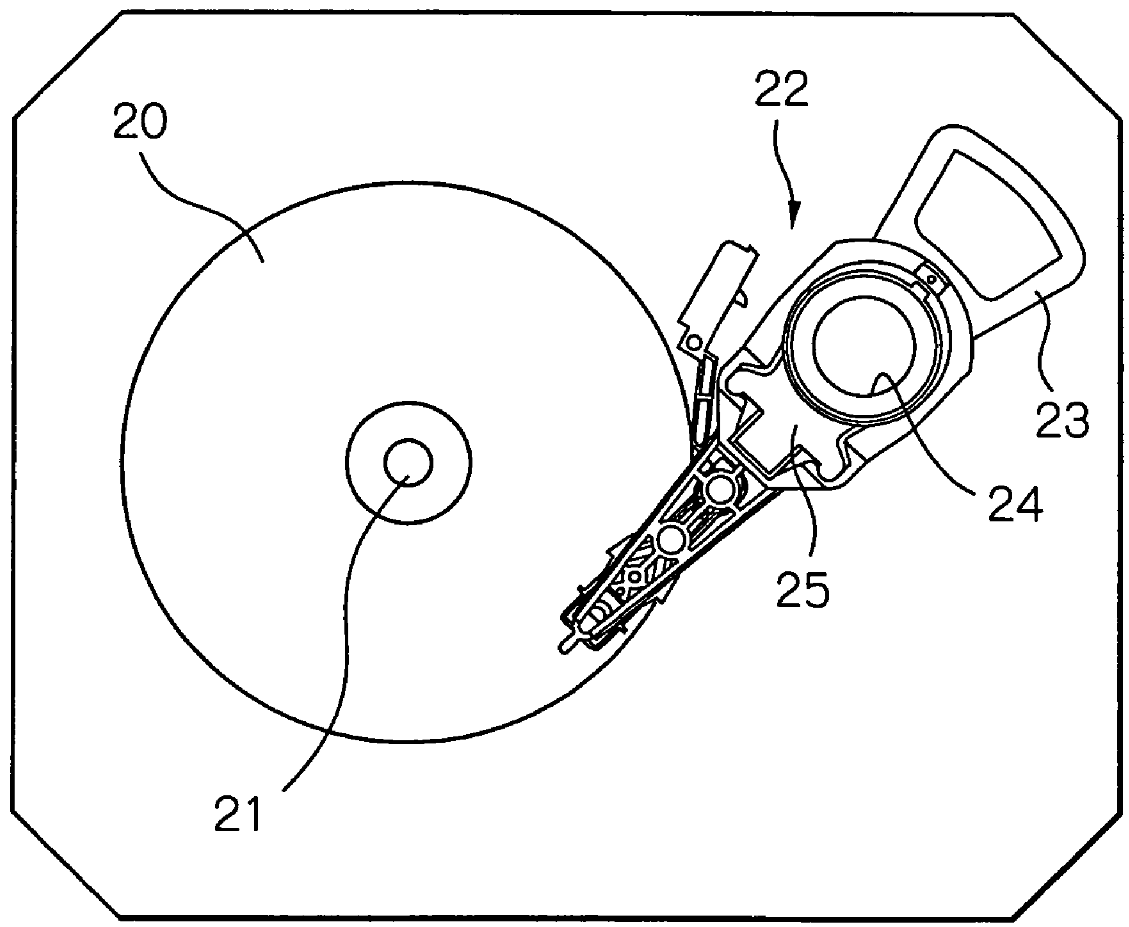
FIG. 2 is a plan view schematically illustrating a configuration of a main part of a magnetic disk drive apparatus as a preferred embodiment according to the present invention.
Figure 3A:
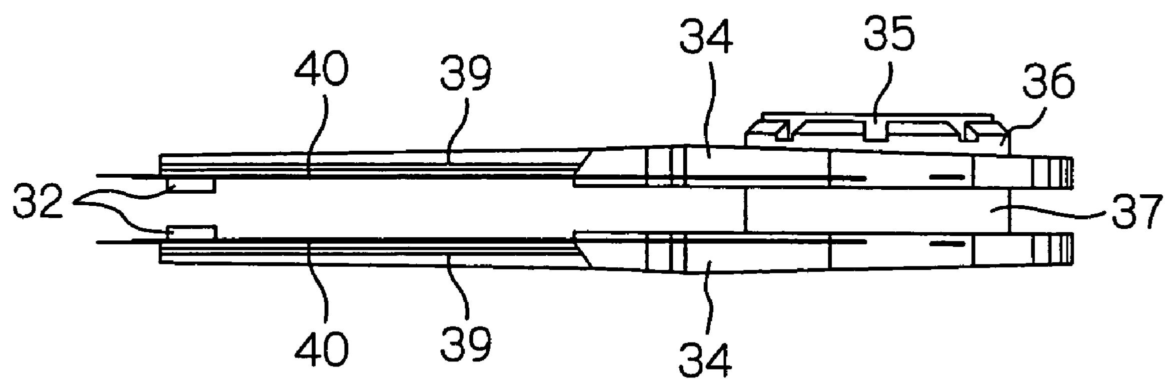
FIGS. 3*a* to 3*d* are an elevation view, a plan view, a side view and a bottom view illustrating two HAAs mounted in the magnetic disk drive apparatus shown in FIG. 2.
Figure 3B:
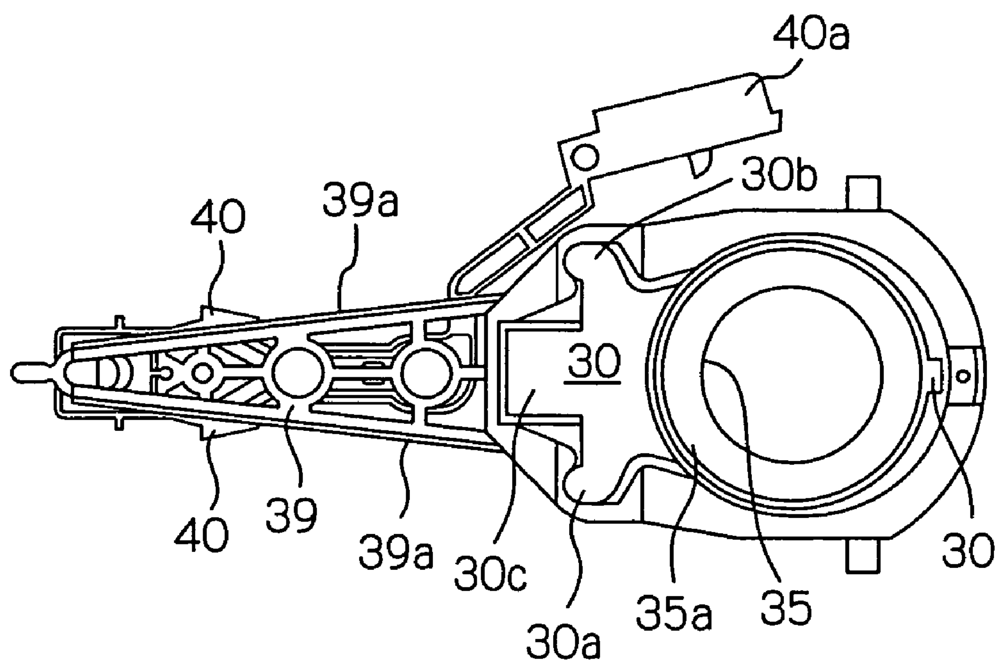
Figure 3C:
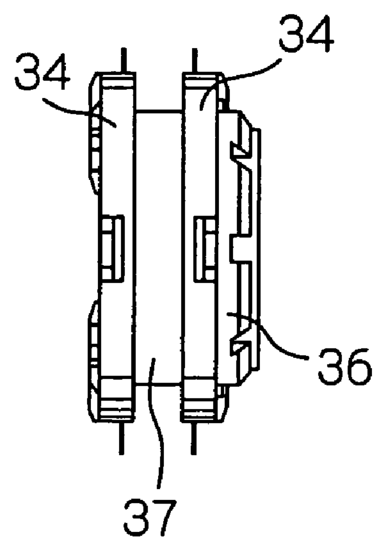
Figure 3D:
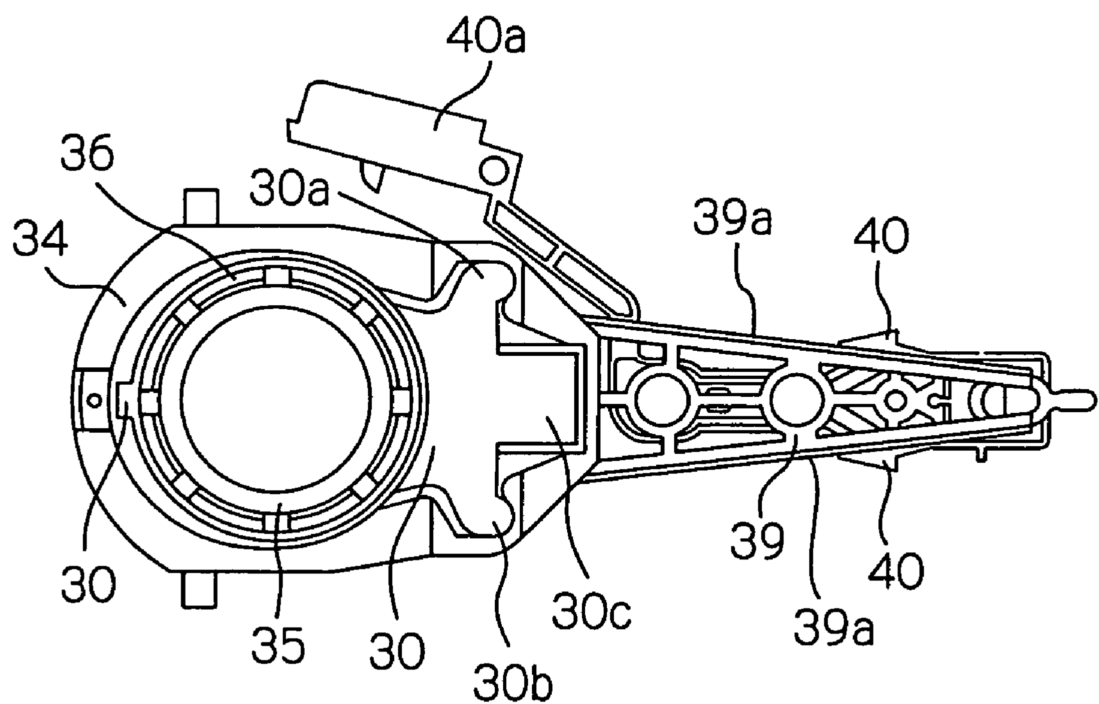
Figure 4:
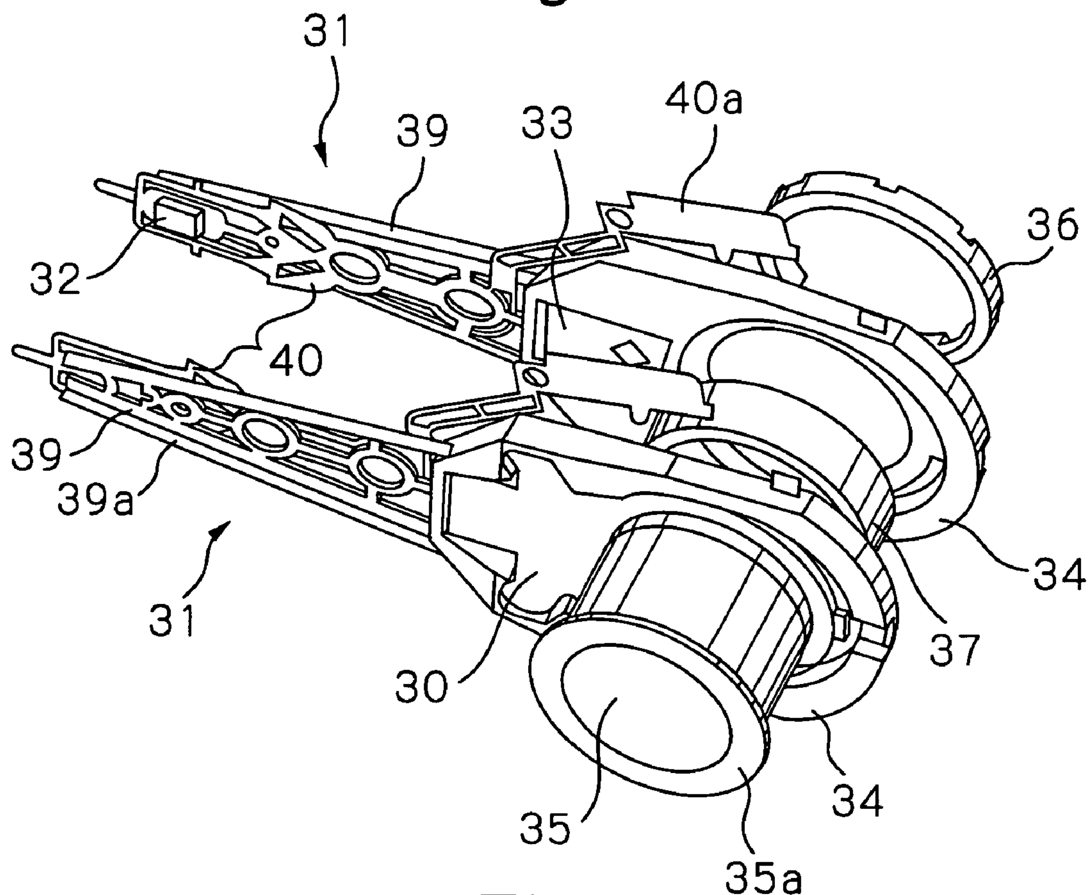
FIG. 4 is an exploded perspective view illustrating the two HAAs shown in FIGS. 3*a* to 3*d;*
Figure 5:
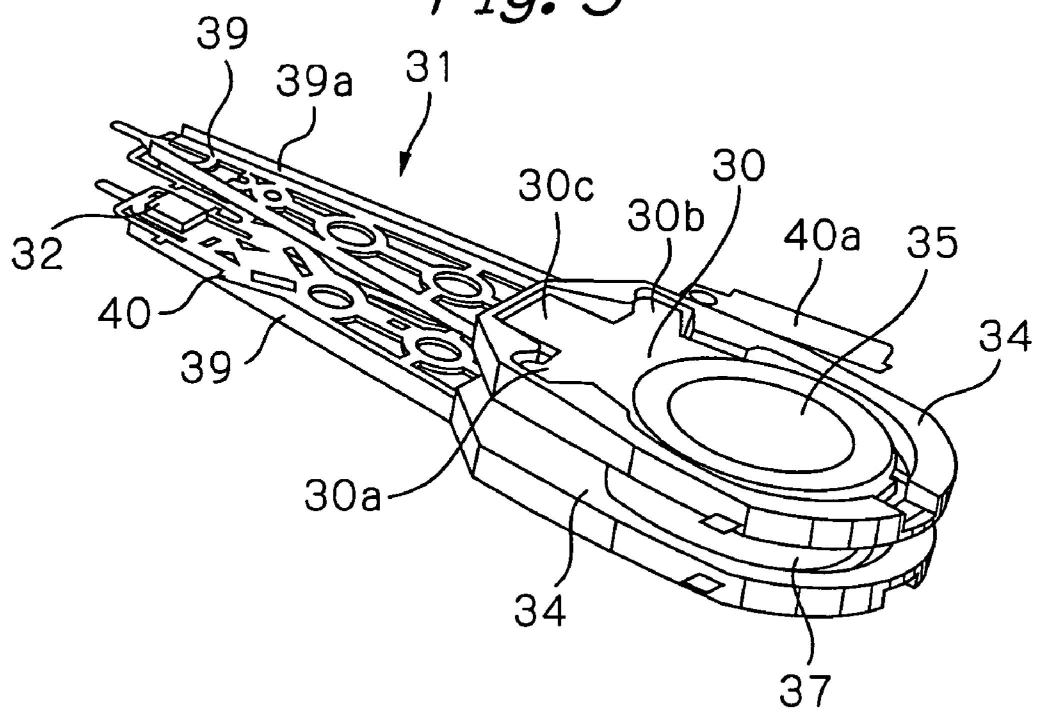
FIG. 5 is a perspective view illustrating the two HAAs shown in FIGS. 3*a* to 3*d;*
Figure 6:
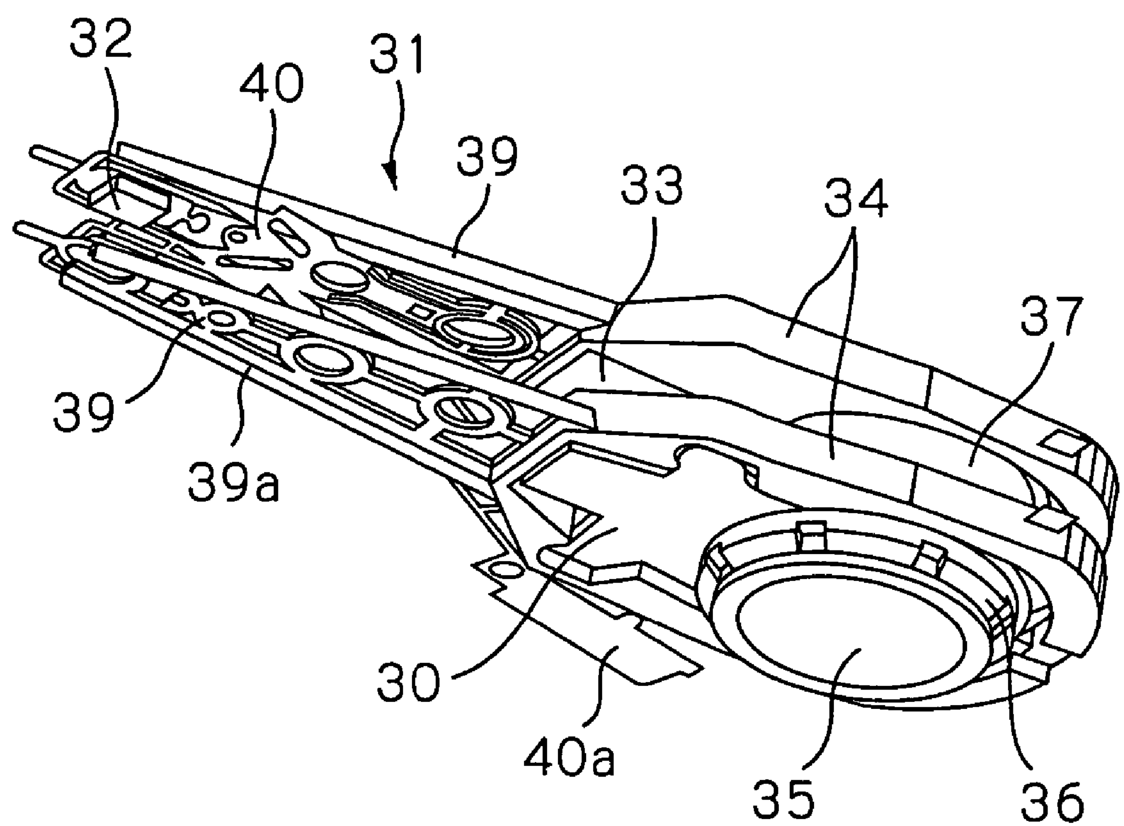
FIG. 6 is a perspective view illustrating the two HAAs of FIGS. 3*a* to 3*d* as seen from the opposite direction.
Figure 7:
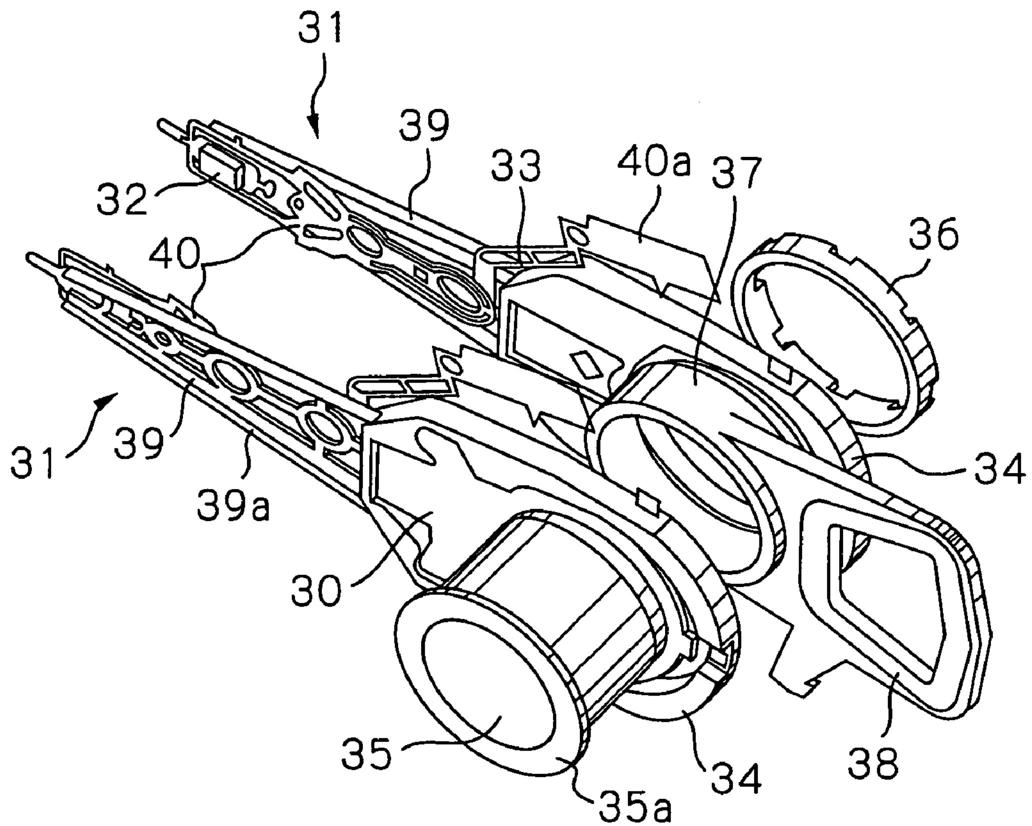
FIG. 7 is an exploded perspective view illustrating two HAAs and a VCM coil section mounted in the magnetic disk drive apparatus shown in FIG. 2.
Figure 8:
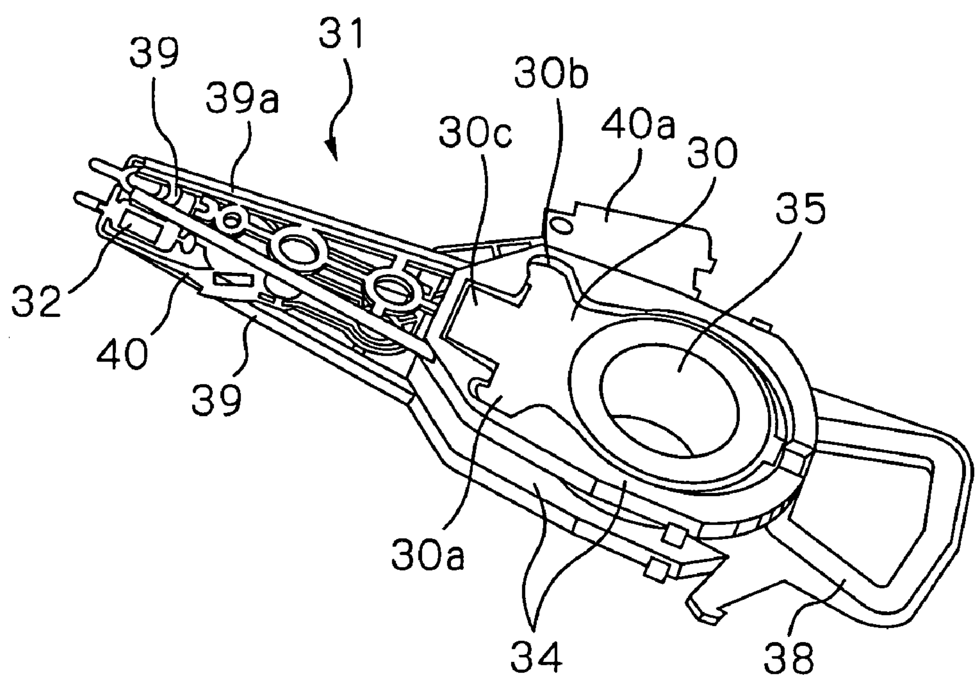
FIG. 8 is a perspective view illustrating the HAAs and VCM coil section shown in FIG. 7.

FIG. 2 schematically illustrates a configuration of a main part of a magnetic disk drive apparatus as a preferred embodiment according to the present invention, FIGS. 3*a* to 3*d* illustrate two HAAs mounted in the magnetic disk drive apparatus shown in FIG. 2, FIGS. 4 and 5 illustrate the two HAAS, FIG. 6 illustrates the two HAAs as seen from the opposite direction, and FIGS. 7 and 8 illustrate two HAAs and a VCM coil section mounted in the magnetic disk drive apparatus shown in FIG. 2. In all these figures, the illustration of a wiring pattern is omitted.

In FIG. 2, reference numeral 20 designates a single magnetic disk with a diameter of about 1 inch, which rotates around a shaft 21. Reference numeral 22 designates two HAAs having two magnetic head sliders that are mounted at leading end sections of the respective HAAs and opposed to the respective surfaces of the single magnetic disk 20, and a single VCM coil section 23 mounted at the trailing end sections of the HAAs. Reference numeral 24 designates a bearing housing for rotatively moving a support arm 25 of the two HAAs in a horizontal direction.

The VCM is configured by a coil section 23 and a yoke section (not shown). The VCM rotatively moves the two HAAs 22, stacked along an axial direction of the bearing housing 24, in parallel to a surface of the magnetic disk 20 around the axis of the bearing housing 24 to cause the magnetic head sliders, attached to the respective HAAs, to perform a seek operation.

As shown in FIGS. 3*a* to 8, each HAA mainly has a very rigid support arm 30, a suspension 31, a magnetic head slider 32 mounted at a leading end section of the suspension 31, a plate spring 33 used to generate a load force, and a weight member 34 secured to a trailing end section of the suspension 31 to balance rotation moments.

The suspension 31, the magnetic head slider 32 and the weight member 34 constitute a balance structure that pivots around a load support point 42 that is formed by of a pair of projections (FIG. 11) in a direction substantially perpendicular to the surface of the magnetic disk. The suspension 31 is coupled by a plate spring 33 with the support arm 30. This suspension 31 is in what is called a floating state in which it is not coupled with the support arm 30 or any other members except for the plate spring 33 and the pair of projections.

The two support arms 30 are fixed to a bearing housing 35 (24) that can be rotatively moved in parallel to the surface of the magnetic disk or in a horizontal direction. More concretely, the bearing housing 35 is inserted into mounting holes in the two support arms 30 and is fixedly clamped so as to be sandwiched between a flange section 35*a* of the bearing housing 35 and a fixing sleeve 36 that is coaxial with the bearing housing 35. A predetermined spacing is maintained between the two support arms 30 by inserting a spacer 37 that is coaxial with the bearing housing 35, between the support arms 30.

Actually, as shown in FIGS. 7 and 8, a coil section 38 (23) of a VCM that is an actuator rotatively driving the support arm 30, namely the bearing housing 35, is attached to the rear of the spacer 37.

The support arm 30 is made of a very rigid material, for example, a thick stainless steel plate. Although not shown, a pair of projections constituting a load support point is provided on the back of leading end side sections 30*a* and 30*b*. The plate spring 33 of the suspension 31 is fixed to the back of a leading end section 30*c* of the support arm 30.

The suspension 31 is constituted by a relatively rigid load beam 39, an elastic flexure 40 supported by the load beam 39, and a wiring member (not shown).

The load beam 39 is formed of a single metal plate such as a stainless steel plate (for example, SUS304TA) with a thickness of about 40 to 60 μm, which is more rigid than the flexure 40, or a multilayered plate member with a metal plate layer such as a stainless steel plate (for example, SUS304TA), a resin layer of polyimide or the like and a metal plate layer such as a stainless steel plate (for example, SUS304TA) stacked each other. Side edges of the load beam 39 are made more rigid by box-bending 39*a*.

In this embodiment, the load beam 39 is extended to the rear of the bearing housing 35. In the middle of the load beam 39, the plate spring 33 is integrally formed with the load beam 39 so as to couple the load beam 39 namely the suspension 31 to the support arm 30. More concretely, the plate spring 33 is formed together with the load beam 39 by cutting out the same plate material, or the plate spring 33 is formed by welding a discrete plate spring to the load beam 39.

The plate spring 33 is pressed and bent by the projections 42 at the trailing end section of the load beam 39. This plate spring 33 is deformed by the projection 42 into a three-dimensional bent shape in which the top of the spring plate extends toward the front of the load beam with leaving from a surface of the load beam.

The flexure 40 is formed of a metal plate such as a single elastic stainless steel plate (for example, SUS304TA) with a thickness of about 20 to 30 μm. An elastic tongue section is formed at a leading end section of the flexure 40 to flexibly support the magnetic head slider 32 to stabilize its flying attitude. In this embodiment, the flexure 40 is entirely fixed to the load beam 39 except for a rear tail section 40*a* on or to which an external connection pad for the wiring member is formed or adhered.

Although not shown, on the flexure 40 formed are trace conductors, connection pads and the like for a thin film magnetic head element as a wiring member. The wiring member may be configured by directly forming the trace conductors, the connection pads and the like on the surface of the flexure 40 or by adhering a flexible print circuit (FPC) formed by stacking the trace conductors on the resin layer to the surface of the flexure 40.

In this embodiment, on the magnetic head slider 32, a composite thin-film magnetic head element with a write head element and an MR read head element.

Position, shape and weight of the weight member 34 are determined so that the center of gravity of the suspension 31 including the magnetic head slider 32 coincides with the load support point. The weight member 34 is integrally formed at the trailing end section of the load beam 39 of the suspension 31.

The most important point of this embodiment is that the weight member 34 is formed so as to surround the bearing housing 35 all around its periphery. This allows the weight member 34 to be arranged around the bearing housing 35 so as to place this bearing housing center. It is thus possible to prevent an increase in inertia moment during a seek operation. Also, because it is unnecessary to extend the trailing end of the load beam of the suspension of the balance structure in order to maintain balance, inconvenient interference of the trailing end of the load beam with the bearing housing can be avoided. Further, since the length of the trailing end side of the load beam can be freely set, the balancing of moments can be easily performed. Of course, a high shock resistance can be obtained. In addition, the weight of the trailing end section of the load beam 39 can be reduced to allow the weight member 34 to be extended and located outside the magnetic disk. This avoids the interferences of the HAA with the magnetic disk surface.

The second important point of this embodiment is that the weight member 34 is integrated with the load beam 39 by molding, for example, a liquid crystal polymer that is a molding resin or a resin such as polyphenylene sulfide. In case that the weight member 34 is formed of a molded resin, the degree of freedom in shape is so high that the desired shape can be created. Further, because the thickness can be increased without an increase in weight, it is possible to improve the shock resistance. That is, the employment of the resin material enables the mass to be reduced than that employing the metal material at the sacrifice of a decrease in Young's modulus. Thus, the thickness can correspondingly be increased to allow the use of a material excellent in Young's modulus versus specific gravity or a material having a large Young's modulus in spite of a low specific gravity. This makes it possible to increase the bending rigidity higher than that of the metal material.

Moreover, according to this embodiment, the balance structure is employed. Namely, the load support point is operating as a fulcrum, and the suspension 31 and the magnetic head slider 32 located at the leading end side with respect to the fulcrum are balanced with the suspension 31 and the weight member 34 located at the trailing end side with respect to the fulcrum. This eliminates the need for each HAA to balance with respect to the VCM. Consequently, it is easy to provide a configuration in which a single VCM drives a plurality of HAAs stacked each other.

Figure 9:
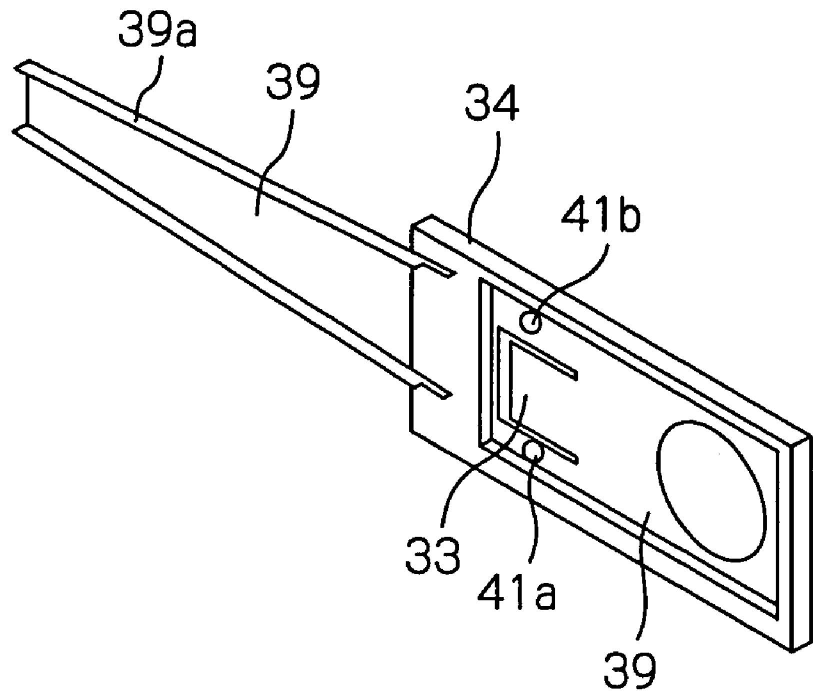
FIG. 9 is a perspective view illustrating a configuration of a weight member in the embodiment of FIG. 2.

As shown in FIG. 9, in this embodiment, furthermore, the weight member 34 is formed to surround not only the bearing housing 35 but also the plate spring 33 and load receiving sections 41*a* and 41*b* of the load beam 39, against which load receiving sections the pair of projections of the support arm 30, constituting the load support point, are abutted. Namely, the weight member 34 is also formed in the leading end side from the plate spring 33 and the load receiving sections 41*a* and 41*b*.

In general, since the load concentrates at the load support point, the load receiving sections of the load beam may be deformed and distorted to absorb energy to prevent the desired load from being obtained. However, because the weight member 34 is formed to surround the load support point as in this embodiment, the deformation of that part can be minimized.

Figure 10:
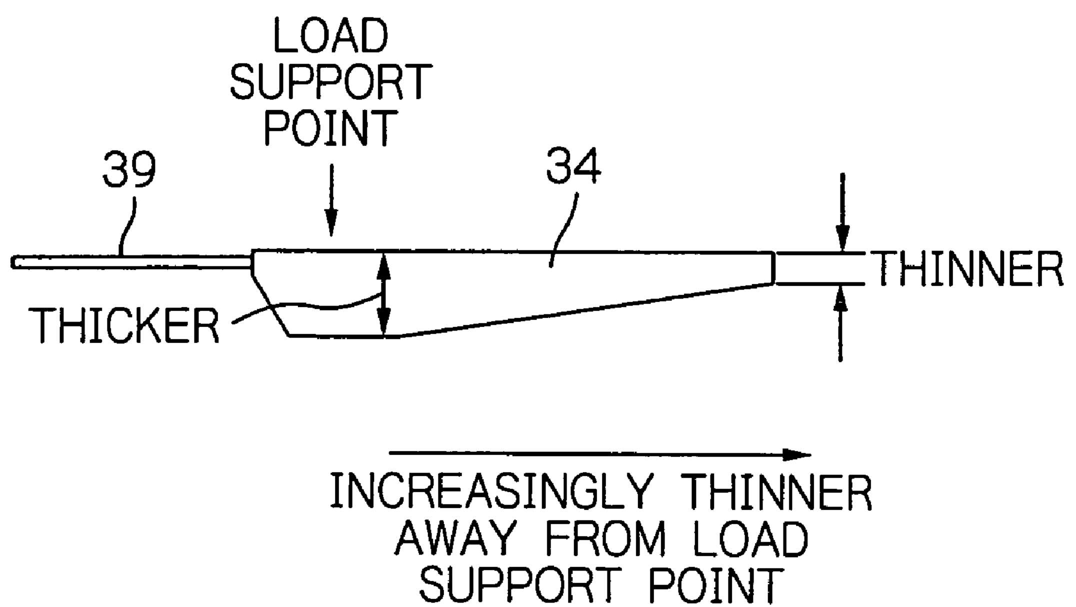
FIG. 10 is a side view illustrating a thickness distribution of the weight member in the embodiment of FIG. 2.

In this case, the thickness of the weight member 34 is desirably not uniform. As shown in FIG. 10, it is desired that the weight member 34 is configured to be thicker near the load support point than in the other parts. That is, the weight member 34 is desirably configured to be increasingly thinner from the vicinity of the load support point toward the trailing end. The weight member is thick around the load support point taking possible deformation into account but increasingly thinner away from the load support point. This is because the trailing end is unlikely to be affected by deformation even though its rigidity is somewhat low, and also because, in contrast, reducing the weight of the trailing end enables a reduction in the magnitude of deformation and thus in inertia moment. Such a shape of the weight member 34 can be easily accomplished by forming the weight member 34 using a resin mold. The weight member can also be realized using a metal plate but this is not practical in terms of the time and cost required for manufacture.

Figure 11:
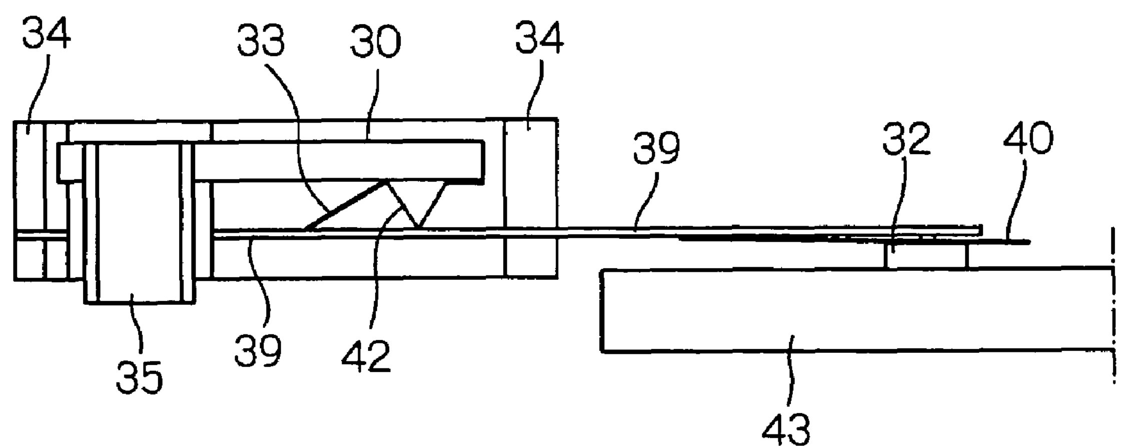
FIG. 11 is a side view illustrating a schematic configuration of the HAA in the embodiment of FIG. 2.

FIG. 11 illustrates a schematic configuration of the HAA in this embodiment.

As shown in the figure, the HAA of this embodiment has a fixed steady position in a direction substantially perpendicular to the surface of the magnetic disk 43 by fixing the support arm 30 to the bearing housing 35. On the other hand, the load beam 39 is coupled only by the plate spring 33 with the support arm 30. Also, using as a fulcrum the load support point 42 consisting of the pair of projections formed on the support arm 30, the load beam 39, the weight member 34, the flexure 40 and the magnetic head slider 32 located between the load support point and the leading end is balanced with the load beam 39 and the weight member 34 located between the load support point and the trailing end. Therefore, in this balance structure, the HAA pivots in the direction substantially perpendicular to the surface of the magnetic disk 43.

The distance between the load support point 42 and the portion at which the support arm 30 is fixed to the bearing housing 35 is determined on the basis of the thickness of the support arm 30 and of the weight of the suspension 31 and the magnetic head slider 32. Because it is necessary to suppress the deformation of the support arm 30 caused by an applied shock, if the weight of the suspension 31 and the magnetic head slider 32 varies, the thickness of the support arm 30 is set so as to prevent an increase in the magnitude of deformation. Normally, the magnitude of deformation is inversely proportional to the third power of the thickness. The previously described distance is determined on the basis of the thickness of the support arm 30 and of the weight of the suspension 31 and the magnetic head slider 32 so as not to increase the magnitude of deformation.

It is empirically known that if the magnitude of deformation of the support arm 30 caused by the application of a shock is at most one-tenth of the distance between the load support point 42 and the surface of the magnetic disk 43, the motion of the suspension of the balance structure is not substantially affected even when a shock is applied.

Figure 12:
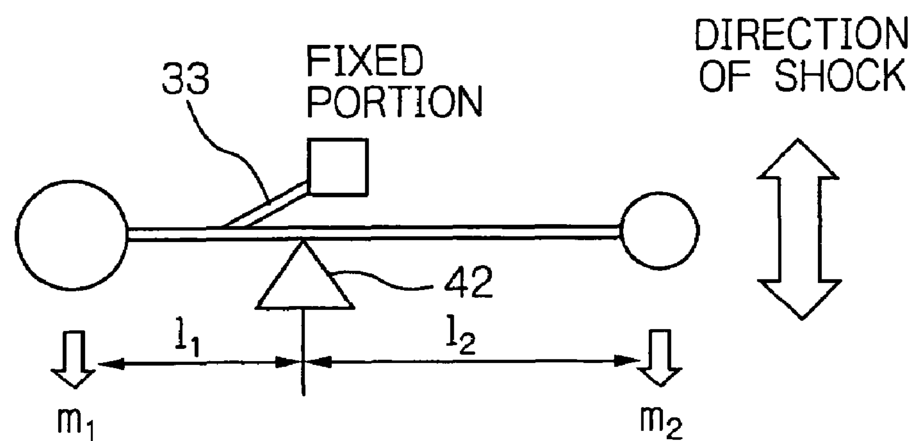
FIG. 12 is a view schematically illustrating operations of a balance structure in the HAA shown in FIG. 11.

FIG. 12 schematically illustrates operations of the HAA of the balance structure. In the figure, reference character $m_1$ designates the center of mass of a trailing end side region between the load support point and the trailing end (VCM side), and reference character $m_2$ designates the center of mass of a leading end side region between the load support point and the leading end (magnetic head slider side).

The balance structure can be established to improve the shock resistance by matching the center of gravity of the system except for the fixed portion with the load support point 42, that is, making right and left rotation moments $m_1\mathbf{1}_1$, and $m_2\mathbf{1}_2$ with respect to the load support point 42 equal. In this case, when an external shock is applied, displacement also occurs at $m_1$ corresponding to the trailing end of the load beam. However, in this embodiment, because the weight member 34 is placed around the bearing housing 35 as previously described, it is not necessary to extend the trailing end of the load beam in order to maintain balance. As a result, the load beam does not interfere with the bearing housing 35. Furthermore, since the length of the trailing end side of the load beam can be freely determined, the balancing of moments can be easily performed. Also, because the weight of the trailing end section of the load beam 39 can be reduced to allow the weight member 34 to be extended and located closer to the trailing end and outside the magnetic disk, it is possible to avoid the interferences of the trailing end of the load beam with the magnetic disk surface.

Figure 13:
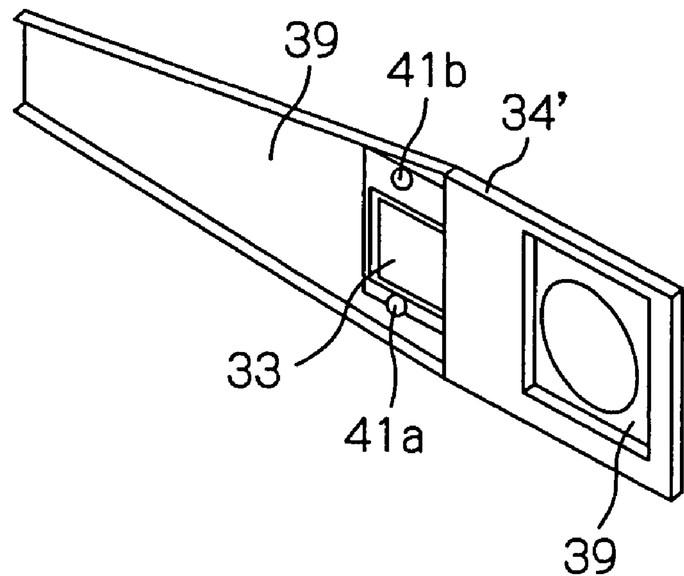
FIG. 13 is a perspective view schematically illustrating a configuration of a weight member in another embodiment according to the present invention.

FIG. 13 schematically illustrates a configuration of a weight member in another embodiment according to the present invention.

As shown in the figure, in this embodiment, a weight member 34' is configured to surround only the bearing housing. Namely, the weight member 34' is formed only in the trailing end side from the plate spring 33 and the load receiving sections 41*a* and 41*b* of the load beam 39 against which the pair of projections of the support arm 30, constituting the load support point 42 (FIG. 11), is abutted. If the deformation of the load beam 39 at the load receiving sections 41*a* and 41*b* does not create any problems, the weight member need not be formed to surround the load support point as described above.

Basically, other configurations, operations, advantages and variations of this embodiment are almost the same as those of the embodiment shown in FIG. 2.

Figure 14:
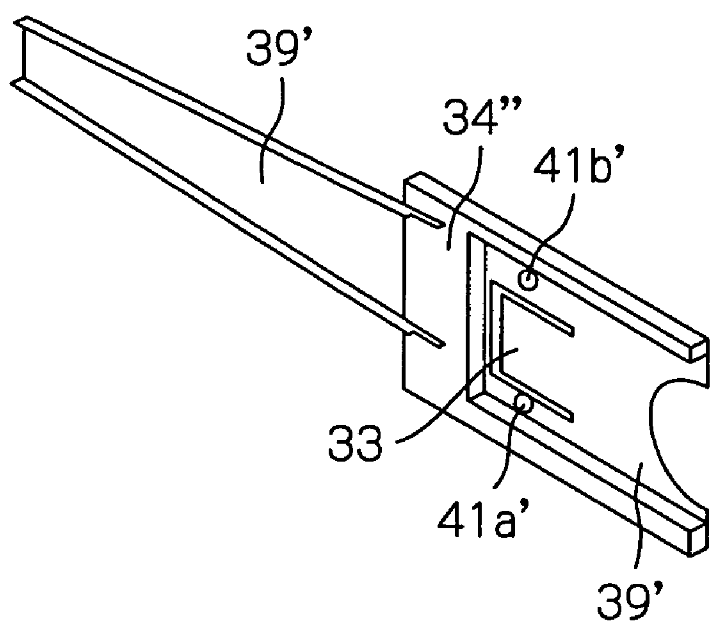
FIG. 14 is a perspective view schematically illustrating a configuration of a weight member in further embodiment according to the present invention.

FIG. 14 schematically illustrates a configuration of a weight member in further embodiment according to the present invention.

As shown in the figure, in this embodiment, a weight member 34" and a load beam 39' are U-shaped and formed to be present only around the periphery of the bearing housing except for its trailing end section. Namely, the weight member 34" is formed only the leading end side from the plate spring 33 and the load receiving sections 41*a'* and 41*b'* of the load beam 39' against which the pair of projections of the support arm 30, constituting the load support point, is abutted.

In other words, the weight member 34" and the load beam 39' in this embodiment is obtained by cutting the weight member 34 and the load beam 39 shown in the embodiment of FIG. 2, so as to eliminate the latter half of the bearing housing position. Such a shape enables the total length of the suspension to be reduced while providing a certain length of the trailing side. This provides a very high shock resistance performance.

Basically, other configurations, operations, advantages and variations of this embodiment are almost the same as those of the embodiment shown in FIG. 2.

In the above embodiments, the load support point is constituted by the pair of projections formed on the support arm. However, a pair of projections may be formed on the load beam of the suspension or a single linear projection may be used in place of the pair of independent dot-like projections.

In the abovementioned embodiments, a single magnetic disk and two HAAs are provided in the magnetic disk drive apparatus. However, in modifications, a plurality of magnetic disks and three or more HAAs may be provided in the magnetic disk drive apparatus. In the latter case, the three or more HAAs may be attached to the bearing housing and be rotatively movably driven in the horizontal direction using a single VCM.

The present invention has been described in conjunction with the HAA including the thin-film magnetic head element and magnetic disk drive apparatus with the HAA. However, the present invention is not limited to such HAA and magnetic disk drive apparatus. Obviously, the present invention is applicable to an HAA provided with a head element other than the thin-film magnetic head element, for example, an optical head element and a disk drive apparatus with the HAA.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A head support mechanism comprising:

a rigid support arm;

a suspension for supporting, at its leading end section, a head slider with at least one head element, said suspension having a balance structure that can be pivoted in a direction crossing a surface of a recording medium using as a fulcrum a load support point established between said suspension and said support arm;

a load generation means for generating a load applied to said load support point for pressing said head slider toward the surface of said recording medium;

a horizontal rotation bearing means for pivotally bearing said support arm and said suspension so that said support arm and said suspension are capable of rotatively moving in a direction parallel to the surface of said recording medium; and a weight member coupled to a trailing end section of said suspension, said weight member having a mass for placing the center of gravity of said suspension including said head slider at a position coincident with said load support point, said weight member being formed to surround said horizontal rotation bearing means around at least a part of the periphery of said horizontal rotation bearing means.

2. The head support mechanism as claimed in claim 1, wherein said weight member is formed to surround said horizontal rotation bearing means all around the periphery of said horizontal rotation bearing means.

3. The head support mechanism as claimed in claim 1, wherein said weight member is formed around the periphery of said horizontal rotation bearing means except for a trailing end section of the periphery of said horizontal rotation bearing means.

4. The head support mechanism as claimed in claim 1, wherein said weight member is also formed in a leading end side of said suspension from said load support point.

5. The head support mechanism as claimed in claim 1, wherein said weight member is thicker at a section near said load support point than at another section.

6. The head support mechanism as claimed in claim 5, wherein said weight member is increasingly thinner away from a vicinity of said load support point toward its trailing end.

7. The head support mechanism as claimed in claim 1, wherein said weight member is formed only in a trailing end side of said suspension from said load support point.

8. The head support mechanism as claimed in claim 1, wherein said weight member is made of a molded resin.

9. The head support mechanism as claimed in claim 1, wherein said load support point is a projecting section provided on said support arm.

10. The head support mechanism as claimed in claim 1, wherein said load support point is a projecting section provided on said suspension.

11. The head support mechanism as claimed in claim 1, wherein said support arm is fixed to said horizontal rotation bearing means.

12. The head support mechanism as claimed in claim 1, wherein said load generation means comprises a plate spring coupled with said suspension and said support arm.

13. The head support mechanism as claimed in claim 1, wherein said suspension comprises a rigid load beam, and a flexure fixed to said load beam, said flexure having an elasticity to control a flying attitude of said head slider mounted at the leading end section of said suspension.

14. The head support mechanism as claimed in claim 13, wherein said load generation means comprises a plate spring formed integrally with said load beam and coupled with said support arm.

15. The head support mechanism as claimed in claim 1, wherein said head support mechanism further comprises an actuator means fixed to said horizontal rotation bearing means for rotatively moving said support arm and said suspension in a direction parallel to the surface of said recording medium.

16. A head arm assembly including a head support mechanism, and a head slider provided with at least one head element, said head support mechanism comprising:

a rigid support arm;

a suspension for supporting, at its leading end section, said head slider, said suspension having a balance structure that can be pivoted in a direction crossing a surface of a recording medium using as a fulcrum a load support point established between said suspension and said support arm;

a load generation means for generating a load applied to said load support point for pressing said head slider toward the surface of said recording medium;

a horizontal rotation bearing means for pivotally bearing said support arm and said suspension so that said support arm and said suspension are capable of rotatively moving in a direction parallel to the surface of said recording medium; and a weight member coupled to a trailing end section of said suspension, said weight member having a mass for placing the center of gravity of said suspension including said head slider at a position coincident with said load support point, said weight member being formed to surround said horizontal rotation bearing means around at least a part of the periphery of said horizontal rotation bearing means and being thicker at a section near said load support point than that at another section.

17. The head arm assembly as claimed in claim 16, wherein said weight member is formed to surround said horizontal rotation bearing means all around the periphery of said horizontal rotation bearing means.

18. The head arm assembly as claimed in claim 16, wherein said weight member is formed around the periphery of said horizontal rotation bearing means except for a trailing end section of the periphery of said horizontal rotation bearing means.

19. The head arm assembly as claimed in claim 16, wherein said weight member is also formed in a leading end side of said suspension from said load support point.

20. The head assembly as claimed in claim 16, wherein said weight member is thicker at a section near said load support point than at another section.

21. The head arm assembly as claimed in claim 20, wherein said weight member is increasingly thinner away from a vicinity of said load support point toward its trailing end.

22. The head arm assembly as claimed in claim 16, wherein said weight member is formed only in a trailing end side of said suspension from said load support point.

23. The head arm assembly as claimed in claim 16, wherein said weight member is made of a molded resin.

24. The head arm assembly as claimed in claim 16, wherein said load support point is a projecting section provided on said support arm.

25. The head arm assembly as claimed in claim 16, wherein said load support point is a projecting section provided on said suspension.

26. The head arm assembly as claimed in claim 16, wherein said support arm is fixed to said horizontal rotation bearing means.

27. The head arm assembly as claimed in claim 16, wherein said load generation means comprises a plate spring coupled with said suspension and said support arm.

28. The head arm assembly as claimed in claim 16, wherein said suspension comprises a rigid load beam, and a flexure fixed to said load beam, said flexure having an elasticity to control a flying attitude of said head slider mounted at the leading end section of said suspension.

29. The head arm assembly as claimed in claim 28, wherein said load generation means comprises a plate spring formed integrally with said load beam and coupled with said support arm.

30. The head arm assembly as claimed in claim 16, wherein said head support mechanism further comprises an actuator means fixed to said horizontal rotation bearing means for rotatively moving said support arm and said suspension in a direction parallel to the surface of said recording medium.

31. A disk drive apparatus including at least one recording medium, and at least one head arm assembly that has a head support mechanism and a head slider provided with at least one head element, said head support mechanism comprising:

a rigid support arm;

a suspension for supporting, at its leading end section, said head slider, said suspension having a balance structure that can be pivoted in a direction crossing a surface of a recording medium using as a fulcrum a load support point established between said suspension and said support arm;

a load generation means for generating a load applied to said load support point for pressing said head slider toward the surface of said recording medium;

a horizontal rotation bearing means for pivotally bearing said support arm and said suspension so that said support arm and said suspension are capable of rotatively moving in a direction parallel to the surface of said recording medium; and a weight member coupled to a trailing end section of said suspension, said weight member having a mass for placing the center of gravity of said suspension including said head slider at a position coincident with said load support point, said weight member being formed to surround said horizontal rotation bearing means around at least a part of the periphery of said horizontal rotation bearing means and being thicker at a section near said load support point than that at another section.

32. The disk drive apparatus as claimed in claim 31, wherein said weight member is formed to surround said horizontal rotation bearing means all around the periphery of said horizontal rotation bearing means.

33. The disk drive apparatus as claimed in claim 31, wherein said weight member is formed around the periphery of said horizontal rotation bearing means except for a trailing end section of the periphery of said horizontal rotation bearing means.

34. The disk drive apparatus as claimed in claim 31, wherein said weight member is also formed in a leading end side of said suspension from said load support point.

35. The disk drive apparatus as claimed in claim 31, wherein said weight member is thicker at a section near said load support point than at another section.

36. The disk drive apparatus as claimed in claim 35, wherein said weight member is increasingly thinner away from a vicinity of said load support point toward its trailing end.

37. The disk drive apparatus as claimed in claim 31, wherein said weight member is formed only in a trailing end side of said suspension from said load support point.

38. The disk drive apparatus as claimed in claim 31, wherein said weight member is made of a molded resin.

39. The disk drive apparatus as claimed in claim 31, wherein said load support point is a projecting section provided on said support arm.

40. The disk drive apparatus as claimed in claim 31, wherein said load support point is a projecting section provided on said suspension.

41. The disk drive apparatus as claimed in claim 31, wherein said support arm is fixed to said horizontal rotation bearing means.

42. The disk drive apparatus as claimed in claim 31, wherein said load generation means comprises a plate spring coupled with said suspension and said support arm.

43. The disk drive apparatus as claimed in claim 31, wherein said suspension comprises a rigid load beam, and a flexure fixed to said load beam, said flexure having an elasticity to control a flying attitude of said head slider mounted at the leading end section of said suspension.

44. The disk drive apparatus as claimed in claim 43, wherein said load generation means comprises a plate spring formed integrally with said load beam and coupled with said support arm.

45. The disk drive apparatus as claimed in claim 31, wherein said head support mechanism further comprises an actuator means fixed to said horizontal rotation bearing means for rotatively moving said support arm and said suspension in a direction parallel to the surface of said recording medium.

46. The disk drive apparatus as claimed in claim 31, wherein said disk apparatus comprises a plurality of the recording media, a plurality of the head arm assemblies sharing said horizontal rotation bearing means, and the single actuator means fixed to said horizontal rotation bearing means for rotatively moving said plurality of the head arm assemblies in a direction parallel to the surface of said recording media.

* * * * *